United States Patent [19]

Amakasu et al.

[11] Patent Number: 4,896,228
[45] Date of Patent: Jan. 23, 1990

[54] MAGNETIC DISC APPARATUS HAVING IMPROVED HEAD POSITION CONTROL

[75] Inventors: Shuji Amakasu, Hanamaki; Munehisa Goto, Yokohama, both of Japan

[73] Assignee: Matsushita Electric Industrial Co., Ltd., Osaka, Japan

[21] Appl. No.: 59,259

[22] Filed: Jun. 5, 1987

[30] Foreign Application Priority Data

Jun. 6, 1986 [JP] Japan .................. 61-132356

[51] Int. Cl.⁴ .................. G11B 5/596; G11B 21/10
[52] U.S. Cl. .................. 360/77.08; 360/77.04; 360/77.05; 360/98.01
[58] Field of Search ............... 360/75, 77, 78, 97–99, 360/135, 77.01, 77.02, 77.04, 77.05, 77.07, 77.08, 78.04, 78.14, 98.01, 98.02

[56] References Cited

U.S. PATENT DOCUMENTS

| Re. 32,075 | 1/1986 | Harrison et al. | 360/77 |
| 4,149,199 | 4/1979 | Chick et al. | 360/77 |
| 4,380,034 | 4/1983 | Krake | 360/77 |
| 4,488,187 | 12/1984 | Alaimo | 360/77 |
| 4,631,606 | 12/1986 | Sugaya | 360/78 |
| 4,809,120 | 2/1989 | Ozawa | 360/78.14 |

FOREIGN PATENT DOCUMENTS

| 0009087 | 4/1980 | European Pat. Off. | |
| 53-76813 | 7/1978 | Japan | 360/77 |
| 53-83717 | 7/1978 | Japan | 360/77 |
| 55-150161 | 11/1980 | Japan | 360/77 |
| 57-86910 | 5/1982 | Japan | |
| 59-52474 | 3/1984 | Japan | 360/77 |
| 60-193176 | 10/1985 | Japan | 360/77 |
| 60-261080 | 12/1985 | Japan | 360/77 |
| 61-59674 | 3/1986 | Japan | 360/77 |
| 61-182680 | 8/1986 | Japan | 360/77 |
| 62-117173 | 5/1987 | Japan | 360/77 |

Primary Examiner—Alan Faber
Assistant Examiner—Steven R. Garland
Attorney, Agent, or Firm—Lowe, Price, LeBlanc, Becker & Shur

[57] ABSTRACT

A data recording magnetic disc apparatus having a plurality of recording surfaces formed on one or more discs has a single servo sector containing servo data for transducer position control provided on each recording surface, the servo sectors of respective surfaces being disposed at respectively different angular positions. Servo data obtained from all of the servo sectors is employed for transducer position control with respect to track center lines, the control including correction for the effects of eccentric rotation of the discs. Accurate head position control is achieved for high data density recording, with a minimum region of each recording track being occupied by servo data.

3 Claims, 3 Drawing Sheets

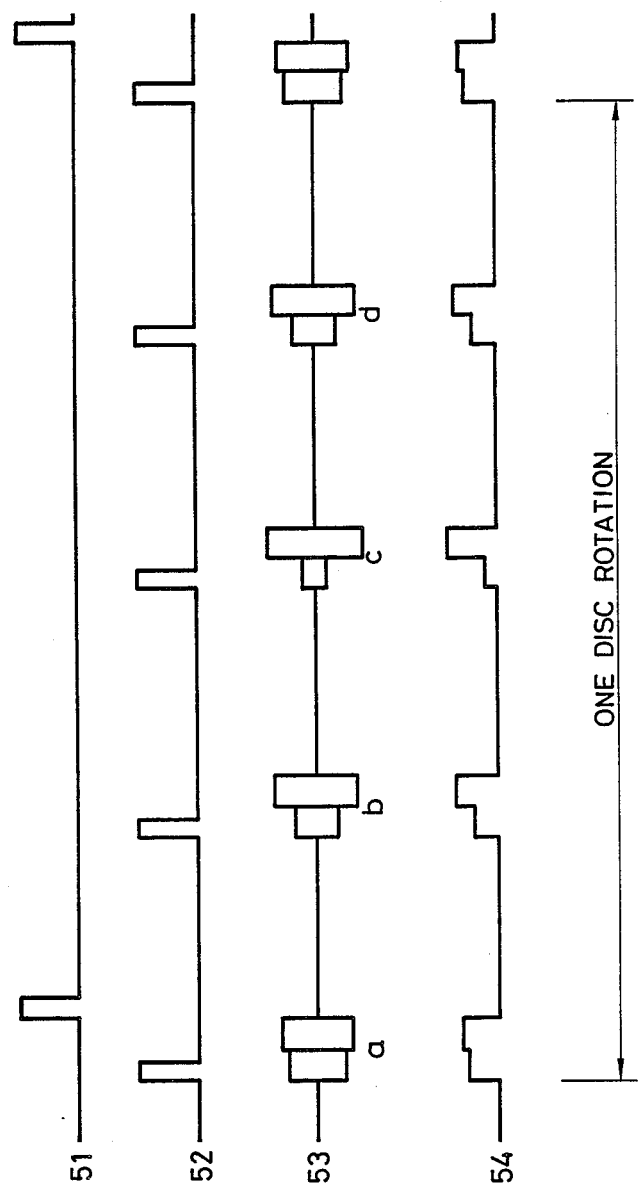

MAGNETIC DISC APPARATUS HAVING IMPROVED HEAD POSITION CONTROL

BACKGROUND OF THE INVENTION

The present invention relates to a magnetic disc apparatus in which position control of data data transducers, i.e. electromagnetic data readout heads, is executed by a head position servo system utilizing servo sectors provided upon disc recording surfaces. In particular, the present invention relates to a magnetic disc apparatus having a plurality of recording surfaces formed on one or more recording discs which are rotated in common.

With a prior art magnetic disc apparatus employing such a head position control technique, either a single servo sector or a plurality of servo sectors are provided on each recording surface, i.e. one servo sector or a plurality of servo sectors is provided for each recording track on a recording surface. Head position control, to maintain a transducer precisely above the center line of a track from which recorded data is to be read out, is performed using position data obtained from the servo sectors.

If a recording disc is rotated about an axis which exactly coincides with the central axis of the disc, then a sufficient degree of position control will be achieved if the head position servo system functions to maintain a single portion of a track (i.e. that occupied by a servo sector) precisely aligned below a transducer. In the case of a prior art apparatus employing only one servo sector on a single recording surface, this is the only form of control which is possible. With such servo control operation, the transducer will be aligned above center line of the track portion containing the servo data. However if rotation is not aligned with the disc central axis, i.e. there is some degree of rotational eccentricity due to some factor such as eccentric alignment of the motor drive shaft which rotates the disc, then a certain amount of wobble of the disc will occur during rotation. Thus, with a single servo sector control system as described above, even if a transducer is maintained precisely above the track center line at one point in each disc rotation, the transducer may become substantially offset from the center line at other rotational positions, if there is some degree of disc wobble as discussed above. This problem sets a limit to the minimum spacing which can be established between adjacent tracks, and hence limits the data recording density. It also becomes increasingly severe as the disc rotation speed is increased in order to achieve higher data readout rates.

By using a plurality of servo sectors on each recording surface, it is possible to substantially overcome this problem, i.e. by deriving servo data successively from the servo sectors during rotation and thereby executing head position control such as to maintain a transducer in optimum alignment with a track center line, i.e. optimum with respect to position deviations due to eccentric rotation as well as with respect to an average position deviation of the track (e.g. resulting from effects of thermal expansion). High rotation speeds are made possible, and closer track spacing can be utilized for increased data recording density. However with such a prior art magnetic disc apparatus in which a plurality of servo sectors are provided for each track, an appreciable amount of track recording capacity is occupied by the servo sectors, and this will substantially reduce the available recording capacity. In addition if the recording format is changed, it may be necessary to change the positions and the number of servo sectors.

Furthermore in the case of a magnetic disc apparatus in which a single servo sector is provided for each track, it is necessary for the disc to rotate by as much as one revolution before head position correction can begin to be executed after a head position changeover command has been issued. Thus, such a method presents problems with regard to the amount of time required for readout of recorded data.

It is an objective of the present invention to overcome the problems of the prior art described above, by providing a magnetic disc apparatus whereby position control is executed accurately while enabling a high level of data recording density and moreover whereby it is not necessary to alter the servo sectors if the recording format is changed.

SUMMARY OF THE INVENTION

In order to accomplish the objectives of the present invention set out above, a magnetic disc apparatus according to the present invention comprises a plurality of recording surfaces formed on one or more recording discs which are rotated in common, transducers which are movably mounted for readout of data from respective ones of these recording surfaces, a single servo sector provided on each recording surface, with respective servo sectors disposed at mutually different angular positions, means for readout of servo data from each of the servo sectors during each rotation of the recording discs, and head position control means for controlling the positions of the transducers in accordance with the servo data thus read out.

Such a magnetic disc apparatus further preferably includes means for generating index signals during rotation of the recording discs at points in time during each disc rotation respectively corresponding to times at which data is to be read out from the servo sectors of the respective recording surfaces, with the servo data selection means being controlled in accordance with these index signals. Such an apparatus further preferably includes dedicated servo preamplifiers for readout of the servo data from each of the servo sectors, these servo preamplifiers being separate from data readout preamplifiers utilized for read out of (non-servo) recorded data from a selected transducer.

BRIEF DESCRIPTION OF THE DRAWINGS

FIG. 3 is a waveform diagram showing output signals which are produced in the embodiment of FIG. 1.

DESCRIPTION OF A PREFERRED EMBODIMENT

Figure 1:
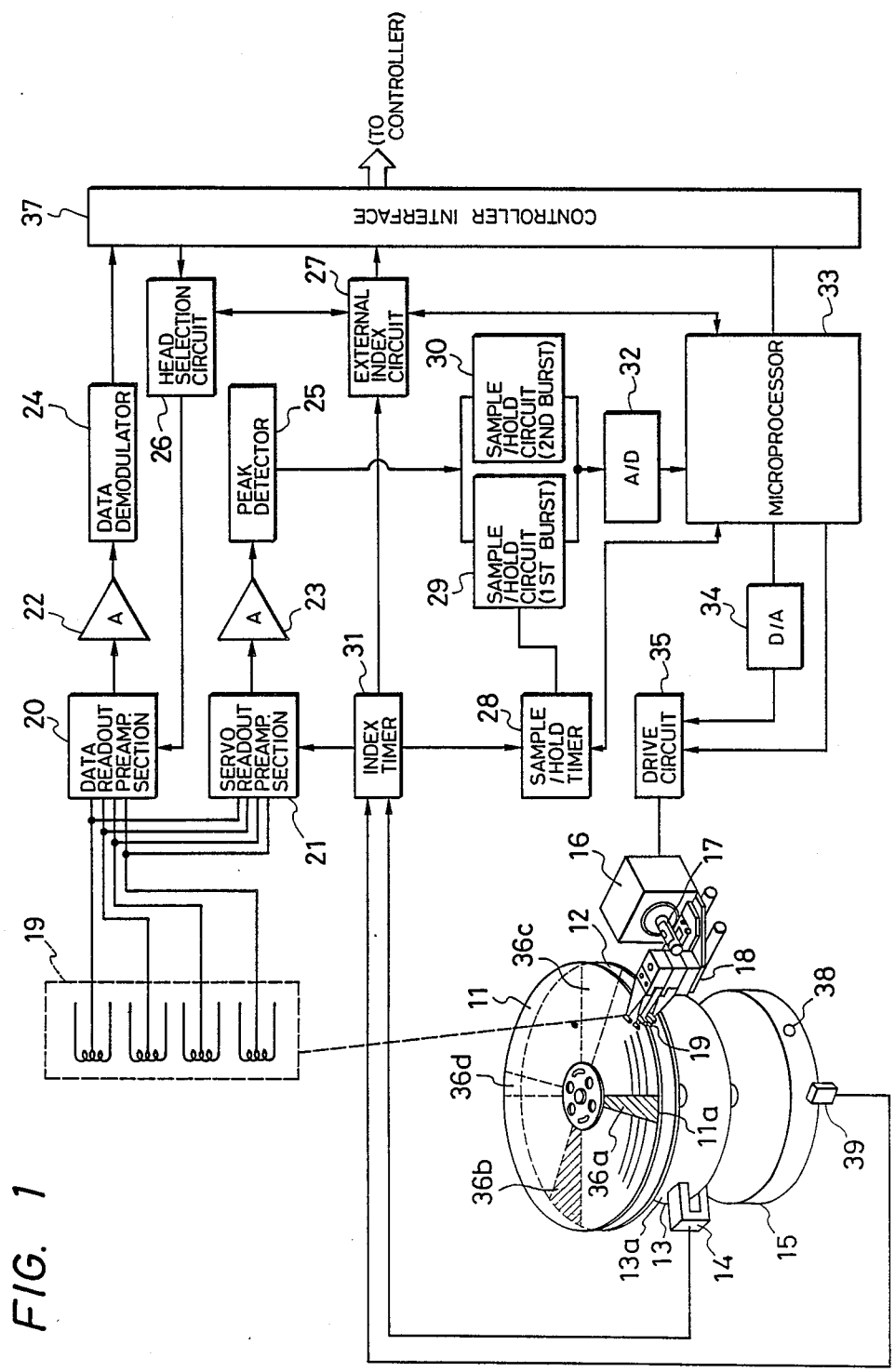
FIG. 1 is a general block diagram of an embodiment of a magnetic disc apparatus according to the present invention.

FIG. 1 shows the general configuration of an embodiment of the present invention, which is a magnetic disc apparatus having two recording discs each having a pair of magnetic recording surfaces formed on opposing faces thereof. Reference numerals 11 and 12 denote these recording discs and 11a denotes an upper recording surface formed on recording disc 11. 13a denotes an index disc having four index holes 13 formed therein which is rotated together with the discs 11 and 12, numeral 14 denotes an index detector and numeral 15 a drive motor for rotating the recording discs. A set of four electromagnetic read heads 19 serve as respective data transducers for the four recording surfaces, and are moved over the recording surfaces by a head drive motor 16. The head drive motor 16 is coupled through a steel belt 17 to a moveable head mounting stage 18 on which the transducers 19 are fixedly mounted. Numeral 20 denotes a data readout preamplifier section, which includes a set of four data readout preamplifiers which are coupled to respective ones of the transducers 19, and which is responsive to a head selection signal supplied from head selection circuit 26 (as described hereinafter) for selecting the output signal from a specific one of these preamplifiers to be transferred as the output from data readout preamplifier section 20. 21 denotes a servo preamplifier circuit section, which includes a set of four servo preamplifiers coupled to respective ones of the transducers 19, for readout of servo data from respective ones of the servo sectors 36a to 36d for use in head position control, and which also includes a switch circuit controlled by an input signal supplied from index timer circuit 31 (as described hereinafter) for transferring the output signals from these preamplifiers to an amplifier 23 at appropriate timings. Numerals 22 and 23 denote amplifiers, 24 a data demodulator circuit and 25 a servo signal peak detector circuit. 26 denotes a head selector circuit, which supplies selection signals to the data readout preamplifier section 20 for selecting one output from the those of the four data preamplifier circuits in section 20, i.e. data from a selected one of the transducers 19, in response to commands supplied from a controller via a controller interface 37. 27 denotes an external index circuit for sending to the controller interface 37 an external index signal which corresponds to the transducer that has been selected. Numeral 28 denotes a sample-and-hold timing circuit for determining the timings at which sample-and-hold operations are performed, 29 and 30 are sample-and-hold circuits, 32 an A/D (analog/digital) converter 33 a microprocessor which functions as a servo controller, and 34 a D/A (digital/analog) converter. Numeral 35 denotes a drive circuit for driving the head motor 16 by microstepping operation, to move the transducers 19 to a designated cylinder in accordance with commands from the controller sent through the interface 37 and to maintain a selected transducer at a centerline position of a track of the designated cylinder. 36a through 36d denote respective servo sectors of the four recording surfaces of discs 11 and 12, which are disposed as shown at respectively different angular positions. Numeral 38 denotes a magnet which is mounted on motor 15 for rotation with the motor drive shaft, and 39 denotes a motor index detector for generating motor index signal pulses in response to movement of the magnet 38.

Figure 2:
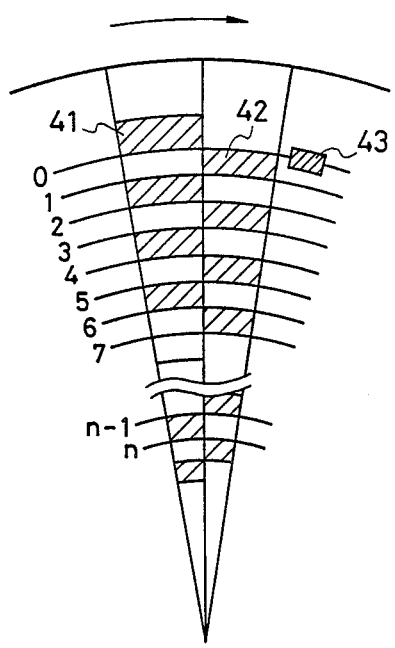
FIG. 2 is a partial view in plan for illustrating the configuration of a servo sector used in the embodiment of FIG. 1.

FIG. 2 shows the configuration of each of the servo sectors 36a to 36d. Such a servo sector contains a set of signal bursts recorded therein. Numeral 41 denotes a first burst, utilized for measuring an amount of track position offset in a direction towards the disc outer periphery, for track 0. Numeral 42 denotes a second burst, utilized for measuring an amount of track offset error in a radially inward direction, for track 0. Numeral 43 indicates the position of a transducer over the disc surface, and the arrow indicates the direction of disc rotation. Numerals 0 to n denote respective track center lines.

FIG. 3 shows electrical signal waveforms of this embodiment. 51 denotes the waveform of the motor index signal which is produced from motor index detector 39, for establishing a relationship between the respective recording surfaces and four index signal pulses which are produced from the index sensor 14 during each rotation of the recording discs. 52 denotes the waveform of this index signal, 53 indicates burst signals which are produced from the servo preamplifiers 21 as respective ones of the servo sectors 36a to 36d pass below the transducers. Numeral 54 denotes the waveform of a signal which is obtained by peak detection of the burst signals.

The operation of the embodiment of FIG. 1 is as follows. As the drive shaft of motor 15 rotates, an index signal pulse having the waveform 52 is produced each time one of the index holes 13 passes the index detector 14. In this embodiment there are four magnetic recording surfaces, and hence four index holes 13, so that so four index signal pulses are produced during each rotation of the recording discs 11 and 12 each synchronized with the passage of a corresponding one of the servo sectors 36a to 36d below the transducers 19. These index signal pulses are supplied together with the motor index signal to the index timer circuit 31, which thereby supplies a selection signal to the servo preamplifier circuit section 21 whereby the output from each servo preamplifier therein is selected to be transferred to amplifier 23 during a time interval in which servo data from the servo sector of the recording surface corresponding to that preamplifier is being read out by the transducers 19. In this way, the servo preamplifier circuit section 21 constitutes a dedicated servo data readout section, whereby servo data for all of the recording surfaces is repetitively generated irrespective of the recording surface from which data is currently being read out through data readout preamplifier section 20. In this way a servo signal having the waveform 53 shown in FIG. 3 is produced as output from the servo preamplifier circuit section 21 and is amplified by amplifier 23. Peak detection of this signal is then performed by peak detector 25, which produces as output the signal having waveform 54 shown in FIG. 3. This signal 54 is then sampled and held by the "burst 1" sample-and-hold circuit 29 and "burst 2" sample-and-hold circuit 30, respectively, at timings which are designated by the sample-and-hold timer circuit 28. That is to say, data of a signal burst resulting from readout of a servo sector portion such as 41 shown in FIG. 2 is held in sample-and-hold circuit 29, and that from a portion such as 42 in FIG. 2 is held in circuit 30. Output signals from sample-and-hold circuits 29 and 30 are converted to digital form by the A/D converter 32, and are transferred to the microprocessor 33, whereby the amount of drive shaft eccentricity and the average amount of track position deviation are computed. A digital quantity is thereby computed by microprocessor 33 for executing correction for the drive shaft eccentricity and track position deviation, and is supplied to D/A converter 34 for conversion to an analog value which is supplied to the drive circuit 35. Drive circuit 35 thereby actuates head drive motor 16 to drive the steel belt 17 such as to apply appropriate position correction to the transducers 19, such that the transducer which is currently selected is maintained correctly positioned above the center line of the appropriate track on the corresponding recording surface.

With the present invention as described in the above, a single servo sector is provided for each of a plurality of recording surfaces, with the respective servo sectors of these recording surfaces being disposed at different angular positions. In addition, dedicated servo preamplifiers are employed which are respectively selected in synchronism with respective index timings for these recording surfaces, such that servo data is obtained from successive ones of the servo sectors during each recording disc rotation. This provides the following advantages:

(1) The amount of track position deviation produced due to eccentricity of the motor drive shaft, and amounts of position deviation for all of the recording surfaces resulting from changes in temperature, can be detected within one rotation of the recording discs. A high degree of accuracy of position control can thereby be attained.

(2) Since one servo sector is provided for each recording surface, a greater amount of recording capacity is made available per cylinder than is the case when a plurality of servo sectors are provided on each recording surface. In addition, it is not necessary to change the positions of the servo sectors if the recording format is changed.

(3) Since position deviation data for all of the recording surfaces is derived continuously, prediction of the track center position and rapid positioning of the heads can be immediately executed when head changeover is commanded by the controller.

If for example the magnetic disc apparatus embodiment of FIG. 1 is assumed to be operating in a condition of data readout from a track on recording surface 11a of recording disc 11, then servo control will be executed in this case based upon servo data obtained from servo sector 36a, i.e. servo data indicating an amount of radial position deviation of the track in question resulting from such factors as thermal expansion of recording disc 11 etc, and moreover based upon data representing the degree of eccentricity of rotation of the recording discs, computed by microprocessor 33 in accordance with the servo data from all of the servo sectors 36a to 36d. In this way, the head servo system can execute accurate and continuous position control even if the recording discs are being rotated at high speed.

It can be understood from the above that rapid initiation of head position control operation after issuance of a head position changeover command is made possible by continuously reading out data from each servo sector of each recording surface, employing dedicated servo preamplifiers for this purpose, so that requisite head position servo data are made available within a time interval which will in general correspond to substantially less than one disc rotation. In addition, the servo data supplied from the servo sectors is utilized (by microprocessor 33 in the above embodiment) to determine an amount of eccentricity of rotation of the recording discs. Thus, when a head changeover command is issued, the position of the center line of the new track from which readout is to take place can be immediately predicted, so that rapid servo "seek" operation can be executed to position the corresponding transducer over that track, i.e. the head position servo loop lock condition can be rapidly attained. This is not possible with a prior art type of magnetic disc apparatus in which a single servo sector is utilized per track.

Furthermore, since only one servo sector is utilized on each recording surface, a substantially greater recording capacity is made available than is possible with a magnetic disc apparatus whereby a plurality of servo sectors are provided on each recording surface.

Moreover with a magnetic disc apparatus according to the present invention, it is not necessary to alter the positions of the servo sectors if the disc recording format is changed.

In the embodiment described above, position control is performed in accordance with a specific recording surface that has been designated by a command from the controller. However it would be equally possible to obtain the average of the servo data from all of the servo sectors, and to hold all of the transducers at an average track center line position, determined by the cylinder which is currently designated and this average servo data, i.e. to to execute head position control only in units of cylinders, irrespective of the recording surface which is currently selected for data readout.

What is claimed is:

1. A magnetic disc apparatus comprising:
   a plurality of magnetic recording surfaces formed coaxially on respective ones of a plurality of recording discs;
   disc drive means for rotating said recording discs;
   a plurality of movably mounted electromagnetic transducers respectively disposed for readout of recorded data from corresponding ones of said magnetic recording surfaces;
   head drive means for moving said transducers;
   data readout circuit means for processing readout signals from said transducers to reproduce said recorded data;
   a single servo sector formed in each of said recording surfaces, said servo sectors being disposed at respective mutually different angular positions and each said servo sector having track centerline servo data recorded therein;
   servo data readout circuit means coupled to receive readout signals from each of said transducers; and
   servo control means including index signal generating means coupled to said disc drive means for generating index signals to respectively designating timings for readout of servo data from each of said servo sectors, said servo control means responsive to (a) said servo data successively readout from each of said servo sectors by said transducers during each rotation of said recording discs, to (b) said index signals produced from said index signal generating means, and to (c) externally supplied command data, for controlling said head drive means to apply track centerline servo control to a currently selected one of said transducers to maintain said transducer aligned with a track centerline position of a corresponding one of said recording surfaces, and in which said servo control means derives rotational eccentricity data of said plurality of recording discs responsive to servo data obtained from all of said servo sectors, and executes said track centerline servo control in response to said rotational eccentricity data to compensate for said rotational eccentricity;
   in which said servo control means comprises data processing means which functions at a time of a changeover from selection of one of said transducers to selection of another one thereof to predict an optimum rack centerline position for servo control of said another transducer at said time of change over, based on said data obtained from all of said servo sectors, and in which said servo control means functions to rapidly move said another transducer to said optimum centerline position upon said change over.

2. A magnetic disc apparatus according to claim 1, in which said plurality of recording discs are rotated in common by a motor drive shaft, and said index signal generating means comprises first index signal generating means for generating an index signal pulse once in each rotation of said motor drive shaft when said shaft attains a first predetermined angular position during each rotation thereof, and second index signal generating means for generating respective index signal pulses at timings when respective ones of said recording discs attain a second predetermined angular position.

3. A magnetic disc apparatus comprising:
- a plurality of magnetic recording surfaces formed coaxially on respective ones of a plurality of recording discs;
- disc drive means for rotating said discs;
- a plurality of movably mounted electromagnetic transducers respectively disposed for readout of recorded data from corresponding ones of said recording surfaces;
- head drive means for moving said transducers;
- data readout circuit means for processing readout signals from said transducers to reproduce said recorded data;
- a single servo sector formed in each of said recording surfaces, said servo sectors being disposed at respective mutually different angular positions and each said servo sector having track centerline servo data recorded therein;
- servo data readout circuit means coupled to receive readout signals from each of said transducers; and
- servo control means including index signal generating means coupled to said disc drive means for generating index signals to respectively designate timings for readout of servo data from said servo sectors, said servo control means responsive to (a) said servo data successively read out from each of said servo sectors by said transducers during each rotation of said recording discs, to (b) said index signals produced from said index signal generating means, and to (c) externally supplied command data, for controlling said head drive means to apply track centerline servo control to a currently selected one of said transducers to maintain said transducer aligned with a track centerline position of a corresponding one of said recording surfaces, and in which said servo control means derives rotational eccentricity data of said plurality of recording discs from servo data obtained from all of said servo sectors, and executes said track centerline servo control in response to said rotational eccentricity data to compensate for said rotational eccentricity, said index signal generating means including a plurality of index detectors, each corresponding to one of said servo sectors and disposed at said different angular positions;

in which said servo control means comprises data processing means which functions at a time of a change over from selection of one of said transducers to selection of another one thereof to predict an optimum track centerline position for servo control of said another transducer at said time of change over, based on said data obtained from all of said servo sectors, and in which said servo control means functions to rapidly move said another transducer to said optimum centerline position upon said change over.

* * * * *